US006606773B1

(12) United States Patent
Mascolo

(10) Patent No.: US 6,606,773 B1
(45) Date of Patent: Aug. 19, 2003

(54) POOL COVER INSTALLATION BAR

(76) Inventor: Alfred J Mascolo, 6 Wellington Rd., Middle Island, NY (US) 11953

( * ) Notice: Subject to any disclaimer, the term of this patent is extended or adjusted under 35 U.S.C. 154(b) by 0 days.

(21) Appl. No.: 10/053,786

(22) Filed: Jan. 20, 2002

(51) Int. Cl.[7] .................................................. B23P 19/04
(52) U.S. Cl. ...................... 29/267; 24/704.1; 24/115 G; 81/176.15
(58) Field of Search ............................ 24/704.1, 115 G, 24/625; 29/267; 81/176.15, 124.2; 411/508

(56) References Cited

U.S. PATENT DOCUMENTS

| | | | | | |
|---|---|---|---|---|---|
| 3,222,699 | A | * | 12/1965 | Zeisig | 7/14.55 |
| 3,908,235 | A | * | 9/1975 | Telliard | 24/73 P |
| 4,303,402 | A | * | 12/1981 | Gooding | 440/101 |
| 4,569,259 | A | * | 2/1986 | Rubin | 81/121.1 |
| 4,576,279 | A | * | 3/1986 | Ferderber | 206/225 |
| 4,836,065 | A | * | 6/1989 | Setliff | 81/124.2 |
| 4,953,269 | A | * | 9/1990 | Ragsdale | 24/704.1 |
| 5,067,213 | A | * | 11/1991 | Ragsdale | 24/704.1 |
| 5,184,377 | A | * | 2/1993 | Ragsdale | 24/704.1 |
| 5,800,089 | A | * | 9/1998 | Donaton | 403/393 |
| 5,911,480 | A | * | 6/1999 | Morgan | 30/41 |
| 6,354,642 | B1 | * | 3/2002 | Haggerty | 294/19.1 |

* cited by examiner

*Primary Examiner*—Joseph J. Hail, III
*Assistant Examiner*—Daniel Shanley
(74) *Attorney, Agent, or Firm*—Michael I Kroll

(57) ABSTRACT

The present invention 10 discloses a tool used to position pool cover compression springs 14 over pool cover anchor bolts 16. The tool is substantially a tube having an angled tubular arm 22. At one distal end the tube has a section removed thereby forming a curvilinear tab 24 that can be used as a fulcrum when attaching the pool cover springs 14 to the inground anchors 16. At the other distal end the pool cover spring tool has a transverse handle 26 providing leverage while using the tool. In addition the handle 26 serves as a compartment 30 for storing tools 32 such as an alien wrench that is used to raise and lower the inground anchor bolts.

8 Claims, 11 Drawing Sheets

POOL COVER INSTALLATION BAR

BACKGROUND OF THE INVENTION

Field of the Invention

The present invention relates generally to tools and, more specifically, to a pool safety cover installation bar, used to position the pool cover compression springs over the pool cover anchors.

The tool is substantially a tube having an angled tubular arm. At one distal end the tube has a section removed thereby forming a curvilinear tab that can be used as a fulcrum when attaching the pool cover springs to the inground anchors. At the other distal end the pool cover spring tool has a transverse handle providing leverage while using the tool.

The T-shaped handle on the angled arm extending from the main shaft provides greater leverage while using the tool. In addition the handle serves as a compartment for storing tools such as an allen wrench that is used to raise and lower the inground anchor bolts.

A user can attach or detach the pool cover compression springs from the anchor bolts that are spaced away from the periphery of an inground pool by positioning the installation bar tab into the compression spring eyelet and then placing the tab onto the far edge of the anchor bolt head and applying a force cause the spring to slid down the tool shaft and over the anchor bolt.

SUMMARY OF THE PRESENT INVENTION

The present invention discloses a tool used to position pool cover compression springs over pool cover anchor bolts. The tool is substantially a tube having an angled tubular arm. At one distal end the tube has a section removed thereby forming a curvilinear tab that can be used as a fulcrum when attaching the pool cover springs to the inground anchors. At the other distal end the pool cover spring tool has a transverse handle providing leverage while using the tool. In addition the handle serves as a compartment for storing tools such as an alien wrench that is used to raise and lower the inground anchor bolts.

A primary object of the present invention is to provide a tool for sliding the pool cover compression spring on and off the inground anchor bolts.

Another object of the present invention is to provide a pool safety cover installation tool having a T-shaped handle on an angled arm extending from the main shaft to provide control and leverage while using the tool Yet another object of the present invention is to provide a pool safety cover installation tool having a T-shaped handle having removable caps whereby tools can be stored within the handle.

Still yet another object of the present invention is to provide a pool safety cover installation tool having a curvilinear tab positioned on one distal end providing a large anchor bolt contact surface that can be used as a fulcrum when attaching the pool cover springs to the inground anchors.

Additional objects of the present invention will appear as the description proceeds.

The present invention overcomes the shortcomings of the prior art by providing a safety cover installation tool used to position the pool cover compression springs over the pool cover anchor bolts.

Also an installation tool having a T-shaped handle on an angled arm extending from the main shaft to provide greater leverage and further providing a compartment within the handle for the storage of tools such as an alien wrench used to raise and lower the inground anchor bolts.

The tool is substantially a tube having an angled tubular arm. At one distal end the tube has a section removed thereby forming a curvilinear tab that can be used as a fulcrum when attaching the pool cover springs to the inground anchors. On the other distal end is a transverse handle with removable caps positioned on each opposing ends.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
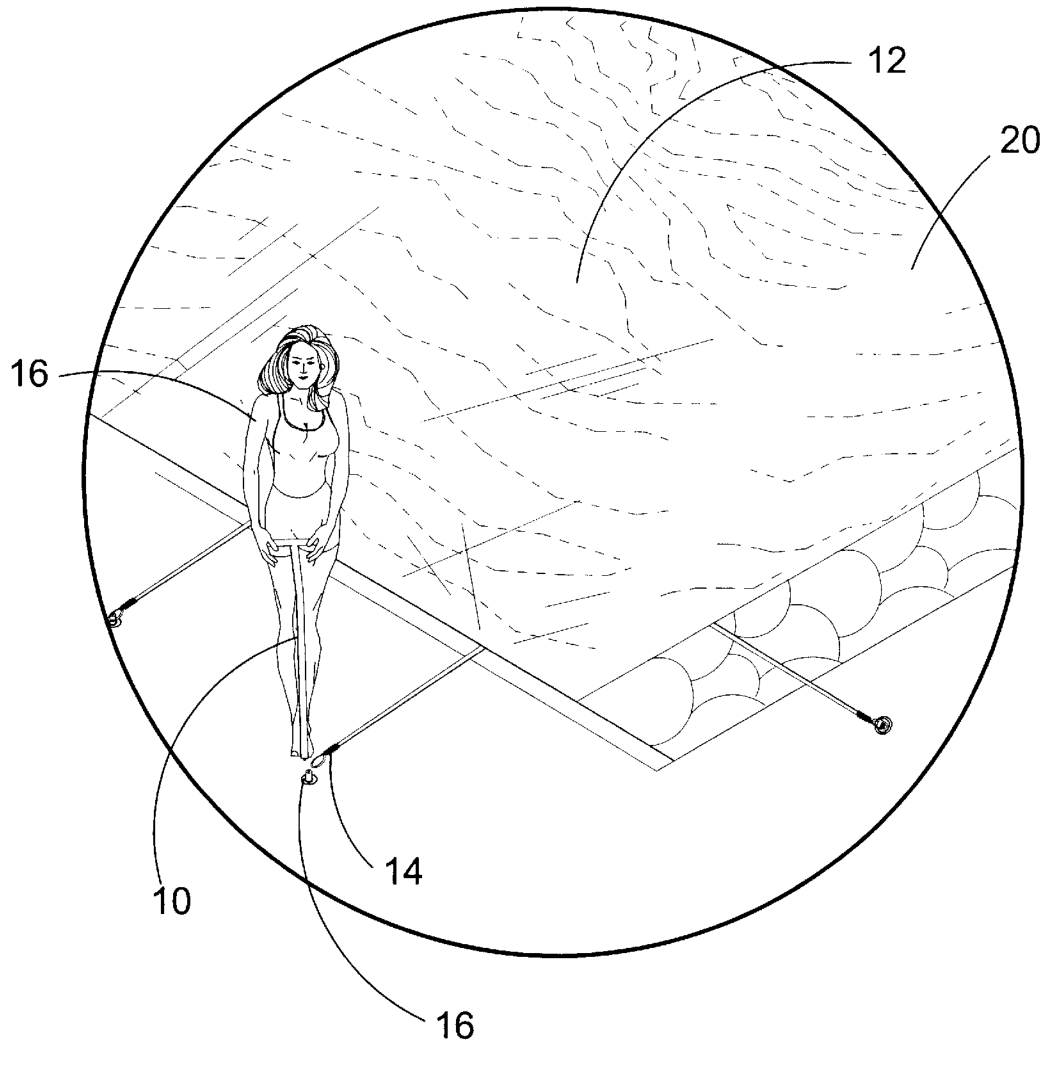
FIG. 1 is an illustrative view of the present invention in use.

With regard to reference numerals used, the following numbering is used throughout the drawings.

10 present invention
12 pool cover
14 compression spring
16 anchor bolt
18 user
20 pool 22 arm
24 tab
26 handle
28 cap
30 cavity
32 tool
34 lower end
36 eyelet
38 receptacle
40 concrete
42 below ground
44 above ground
46 direction arrow

DETAILED DESCRIPTION OF THE PREFERRED EMBODIMENT

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. Shown is an illustration of the pool safety cover installation bar 10 being used to position the compression spring 14 of the pool cover 12 over a pool cover anchor 16. A user 18 can attach or detach the pool cover compression springs 14 from the anchor bolts which are spaced away from the periphery of an inground pool 20 by positioning the installation bar tab that extends from the distal end of the present invention 10 through the eyelet of the pool cover compression spring and over the head of the pool cover anchor. The present invention 10 overcomes the shortcomings of the prior art by providing an installation bar having a t-shaped handle on an angled arm extending from the main shaft to provide greater leverage and further providing a storage compartment with caps wherein tools such as an allen wrench used for raising and lowering the anchors can be stored.

Figure 2:
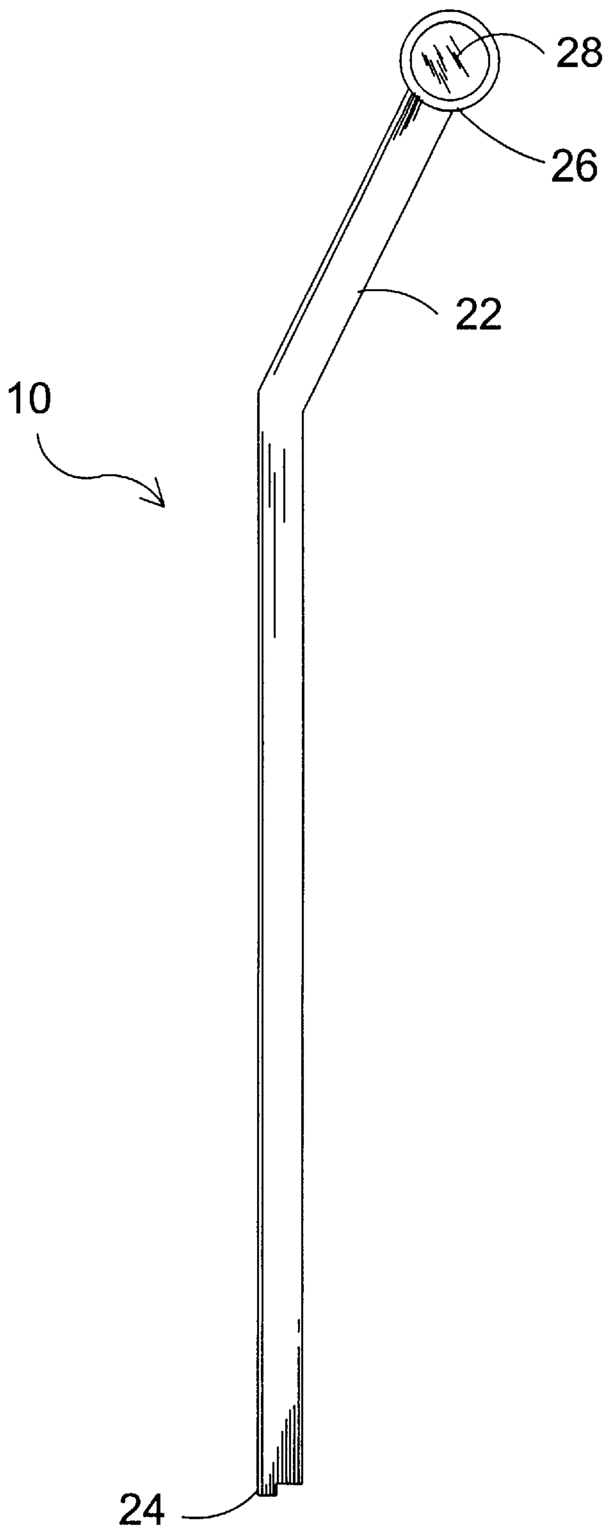
FIG. 2 is a side view of the present invention.

Turning to FIG. 2, shown therein is a side view of the present invention 10. Shown is a side view of the safety cover installation tool 10. The tool 10 is substantially an elongated tube having an angled tubular arm 22. At one distal end the tube has a section removed therefrom thereby forming a curvilinear tab 24 that can be used as a fulcrum when attaching the pool cover springs to the inground anchors. Tab 24 protrudes from the lower end of the present invention 10 and at the other distal end the pool cover installation tool 10 has a transverse handle 26 for providing leverage while using the tool. In addition the hollow handle 26 has a removable cap 28 for storing tools therein such as an allen wrench used to raise and lower the anchor bolts. It can be seen that the bend in the body of the present invention is disposed about one-fourth of the distance from the handle 26 to the tab 24 and the bend is disposed in and operates in a plane parallel to the longitudinal axis of the spring 14 when the tab is inserted into the eyelet of the spring; further, the tab is disposed on a side of the body of the present invention opposite to the direction of the bend.

Figure 3:
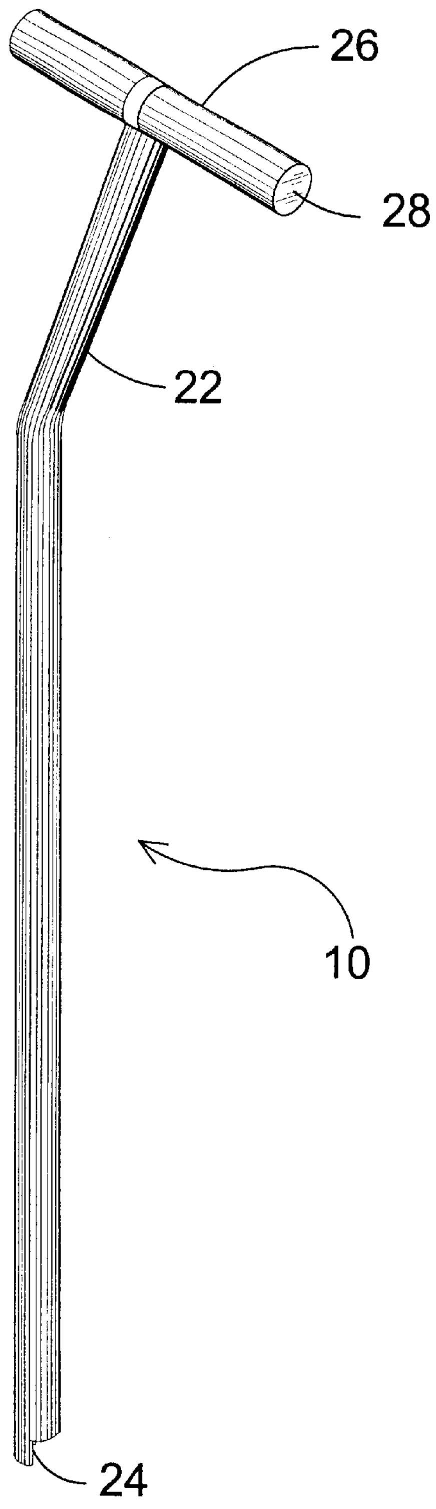
FIG. 3 is a perspective view of the present invention.

Turning to FIG. 3, shown therein is a perspective view of the present invention 10. Shown is the safety cover installation tool 10 having a curvilinear tab 24 that can be used as a pry bar to aid the user in attaching the pool cover spring members to the anchors by placing the end of the tool 10 within the spring eyelet and then placing the tubular distal end over the anchor bolt and applying a forward force causing the eyelet to slide off of the installation tool shaft and onto the anchor. Other elements previously disclosed are also shown.

Figure 4:
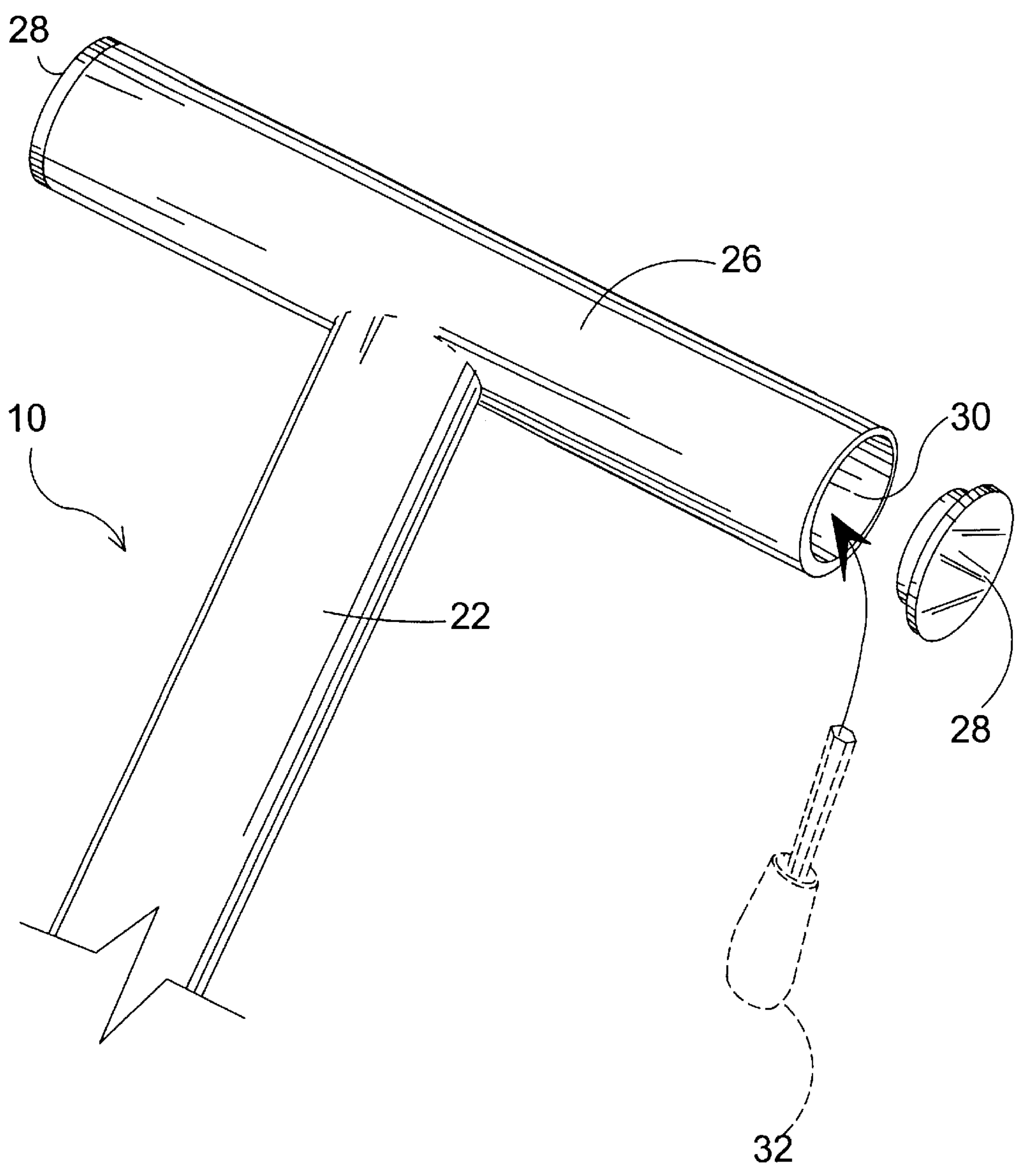
FIG. 4 is an enlarged view of the handle and end caps of the present invention.

Turning to FIG. 4, shown therein is an enlarged view of the arm 22 and handle 26 along with the end caps 28 of the present invention 10. Shown is the tubular transaxle-shaped handle 26 onto which at each end a cap 28 is affixed. The cavity or compartment 30 within the handle 26 can be used to store tools 32, such as an allen wrench used to extend and retract the anchor bolts.

Figure 5:
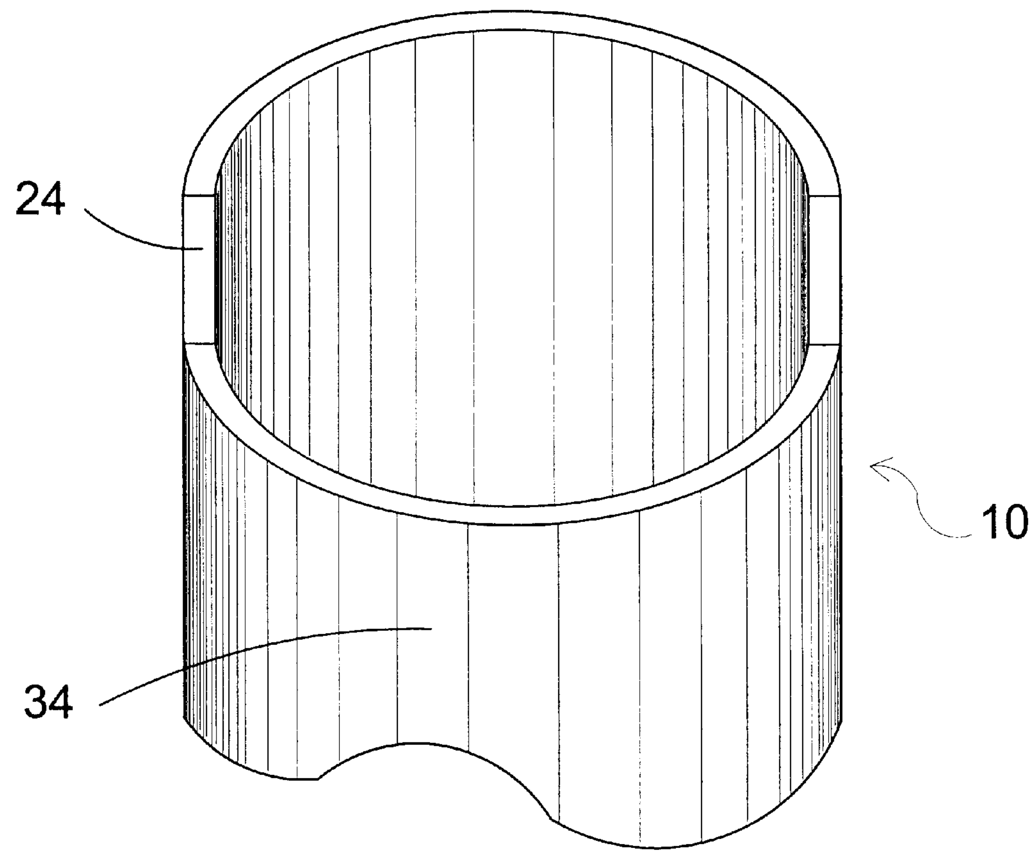
FIG. 5 is an enlarged sectional view of the tool tip of the present invention.

Turning to FIG. 5, shown therein is an enlarged sectional view of the tool tip of the present invention. Shown is the lower distal end 34 of the safety cover installation tool 10 having a protruding curvilinear tab 24 that can be used as a pry bar to aid the user in attaching and removing the pool cover spring members from the anchor bolts.

Figure 6:
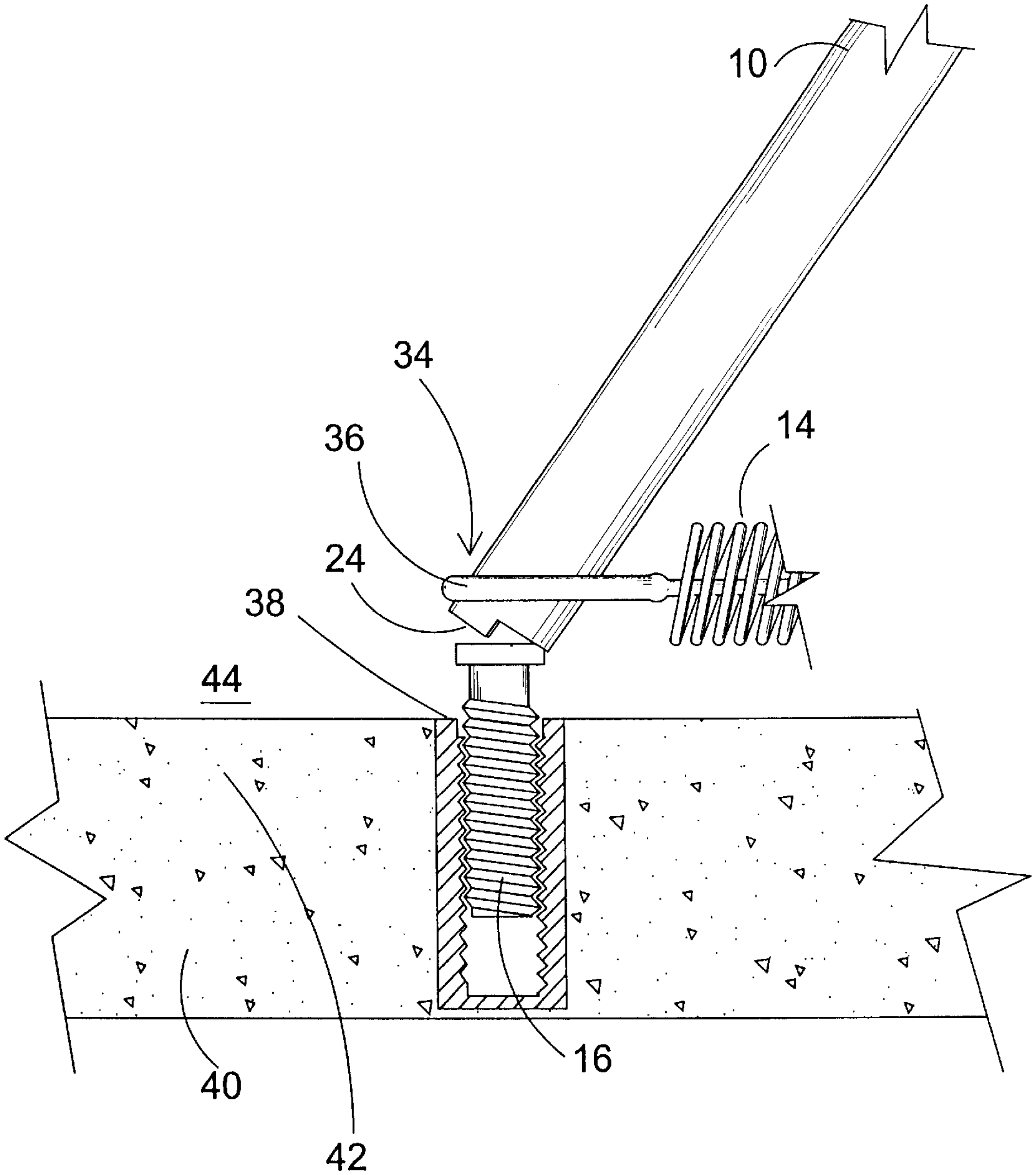
FIG. 6 is an enlarged sectional view of the spring tool having an attached pool cover spring.

Turning to FIG. 6, shown therein is an enlarged sectional view of the present invention 10 inserted through the eyelet 36 of the pool cover spring 14. This sectional view relates to the installation of the pool cover springs 14 in which the safety cover installation tool 10 is used by sliding the eyelet 36 of the spring 14 over the tab 24 and distal end 34 of the tool 10 and placing the tab 24 over and in contact with an anchor bolt 16 and then moving the tool 10 by means of the handle in the direction away from the pool whereby the spring eyelet 36 will slide down off the shaft 34 and onto the body of the inground anchor bolt 16. Also shown are the anchor bolt receptacle 38, concrete 40, a point below ground 42 and above ground 44.

Figure 7:
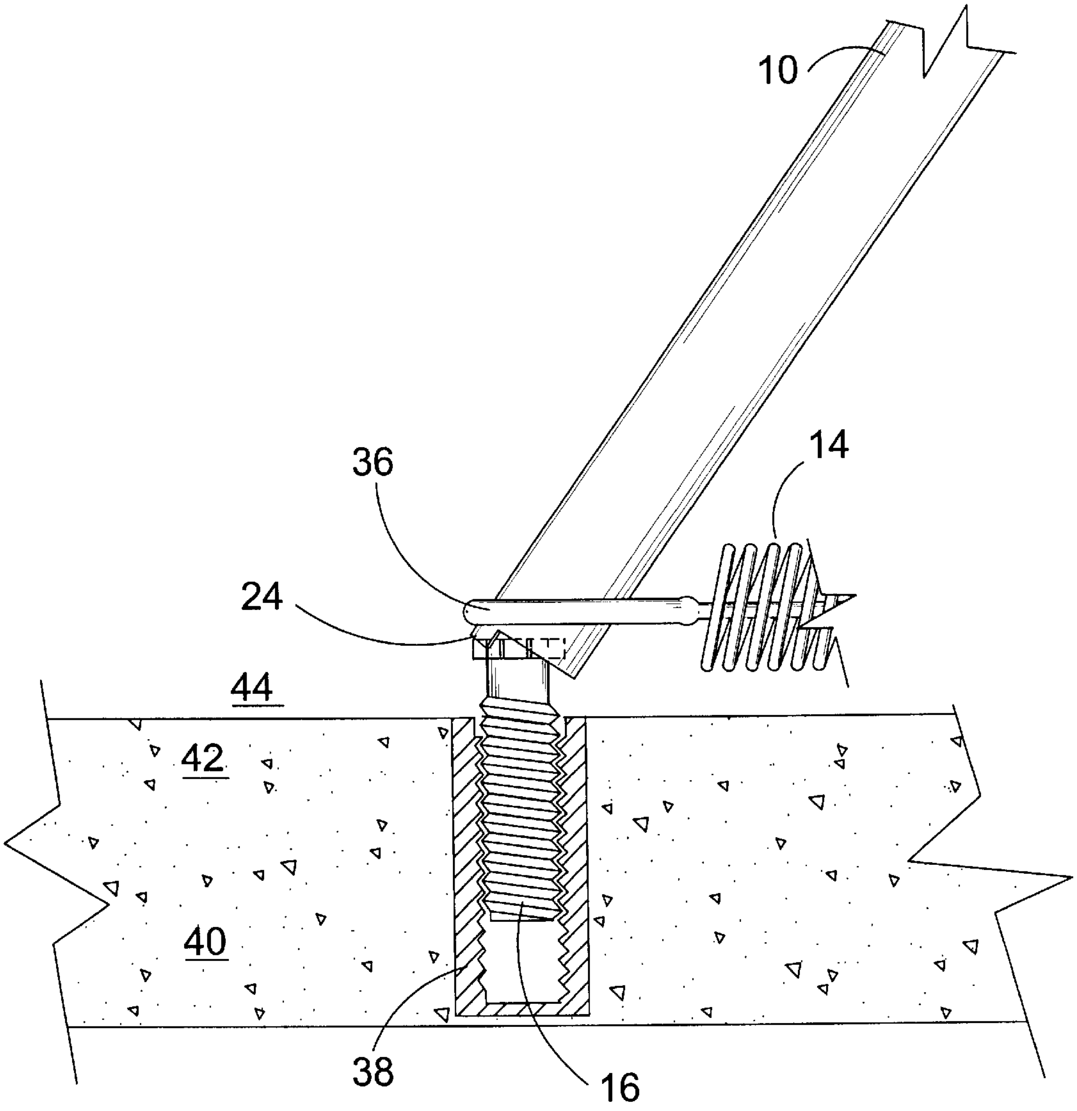
FIG. 7 is an enlarged sectional side view of the present invention with a spring attached.

Turning to FIG. 7, shown therein is an enlarged sectional side view of the present invention 10 with a spring 14 attached. Shown is the safety cover installation tool tab 24 placed over the head of an anchor bolt 16 and having the pool cover spring 14 attached thereto. The curved inner surface of the installation tool tab 24 provides for a greater contact surface between the tool tab 24 and an anchor bolt 16. Other elements previously disclosed are also shown.

Figure 8:
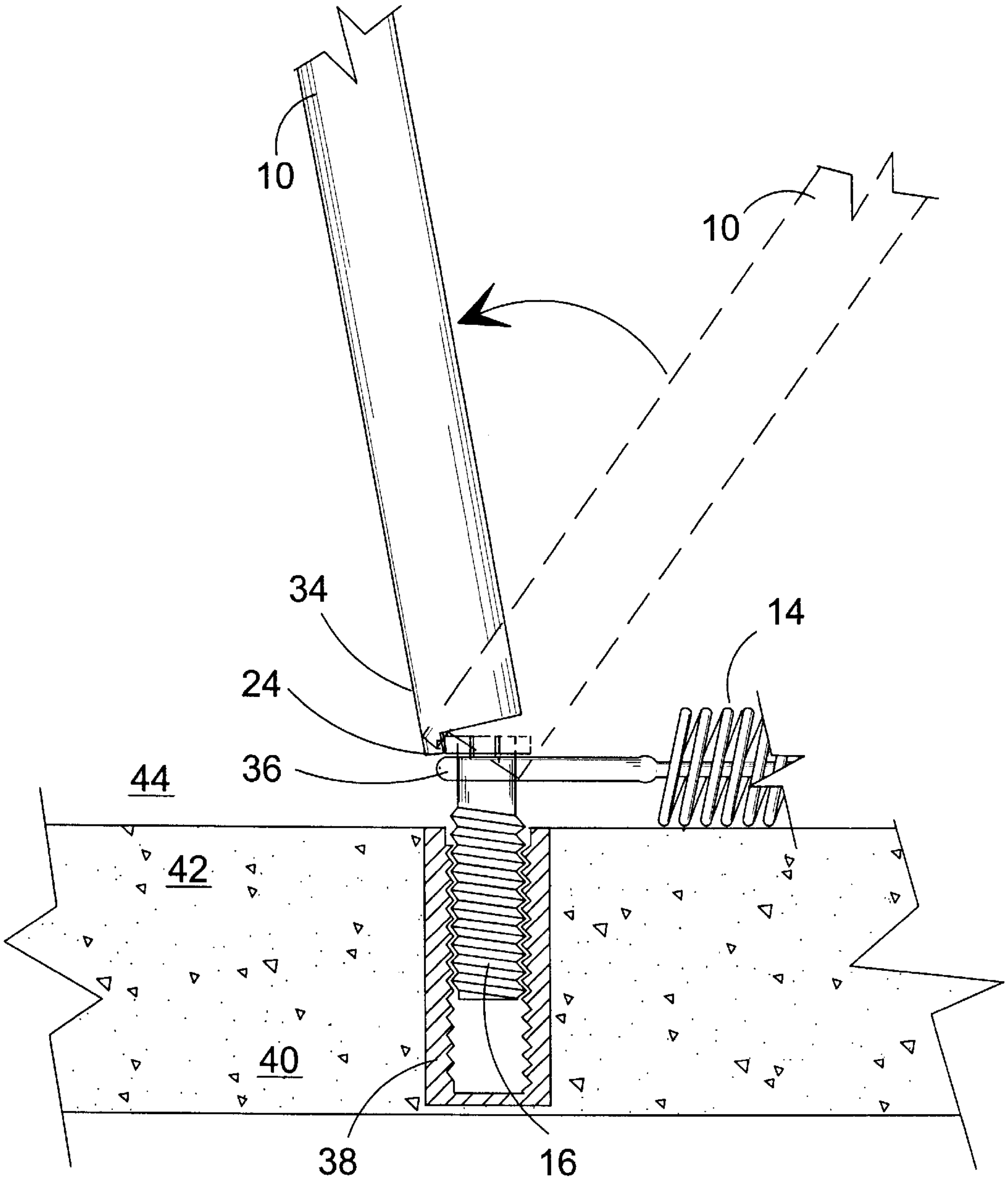
FIG. 8 is an enlarged sectional side view of the present invention with a spring released.

Turning to FIG. 8, shown therein is an enlarged sectional side view of the present invention 10 with a spring 14 being released. Shown is the safety cover installation tool tab 24 placed over the head of an anchor bolt 16 and having the pool cover spring 14 released therefrom by sliding the eyelet 36 down the tool shaft 34 and over and onto the anchor bolt 16. The curved inner surface of the spring tool tab 24 provides for a greater contact surface between the tool tab 24 and an anchor bolt 16. Other elements previously disclosed are also shown.

Figure 9:
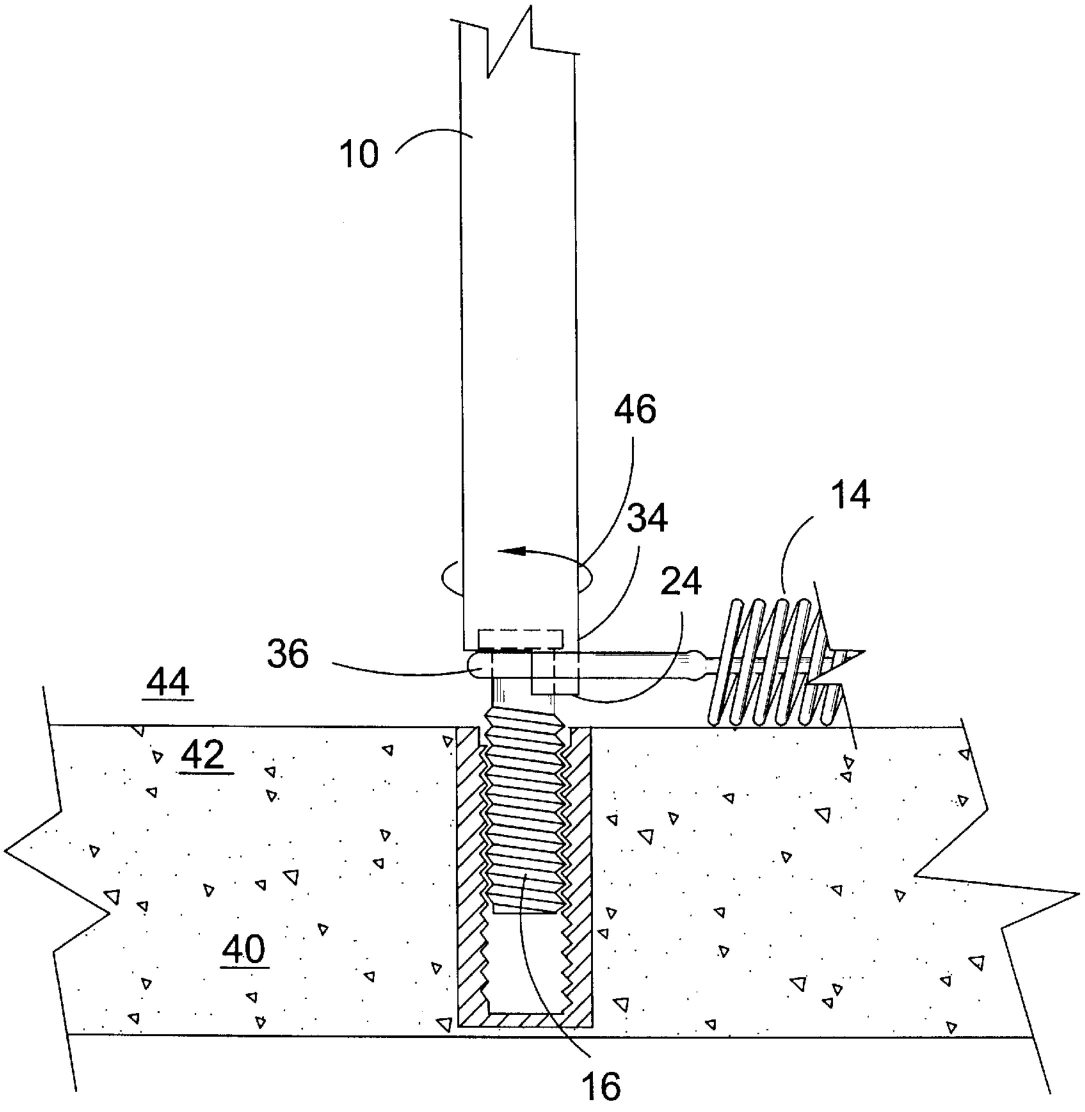
FIG. 9 is a view of the present invention in the process of removing a spring.
Figure 10:
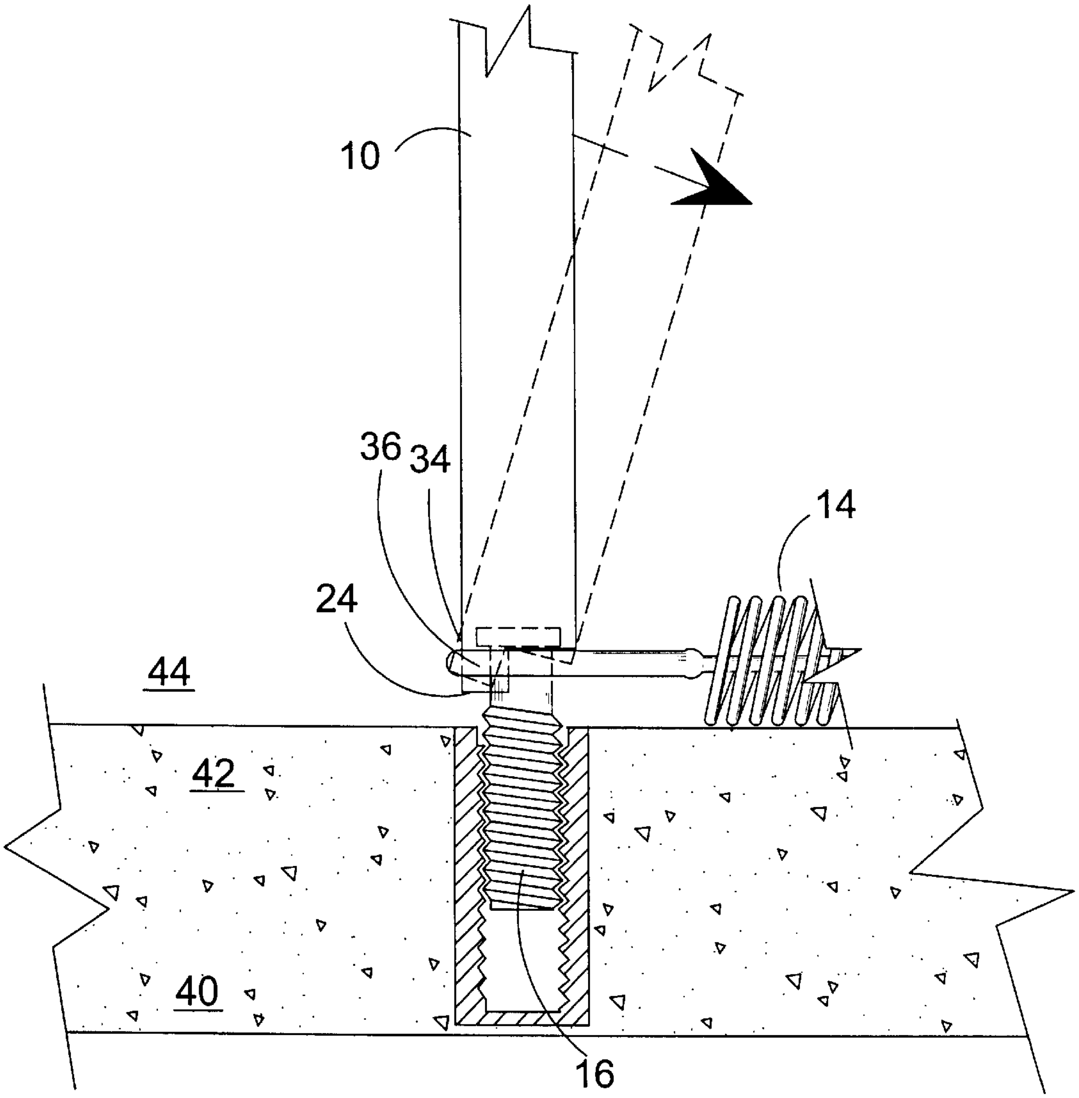
FIG. 10 is a view of the present invention in the process of removing a spring.

Turning to FIG. 9, shown therein is a view of the present invention 10 in the process of removing a spring 14 from the bolt 16. Shown is the tool of the present invention 10 inserted over the anchor bolt 16 with the installation tool tab 24 inserted into the spring eyelet 36. Once the tab 24 of the pool cover installation tool is positioned between the spring eyelet 36 and anchor bolt 16, a rotating force, which rotates tab 24 about 180 degrees, as shown by direction arrow 46, is applied to the present invention 10 whereupon the spring eyelet 36 moves from the anchor bolt 16 and up the tab 24 and lower part 34 of the installation tool 10. Other elements previously disclosed are also shown. Turning to FIG. 10, shown therein is a view of the present invention 10 in the process of removing a spring 14 from the bolt 16. Once the tab 24 of the pool cover installation tool is positioned between the spring eyelet 36 and anchor bolt 16, a rotating force is applied to the present invention 10 whereupon the spring eyelet 36 moves from the anchor bolt 10 and up the lower part 34 of the installation tool 10. Other elements previously disclosed are also shown.

Figure 11:
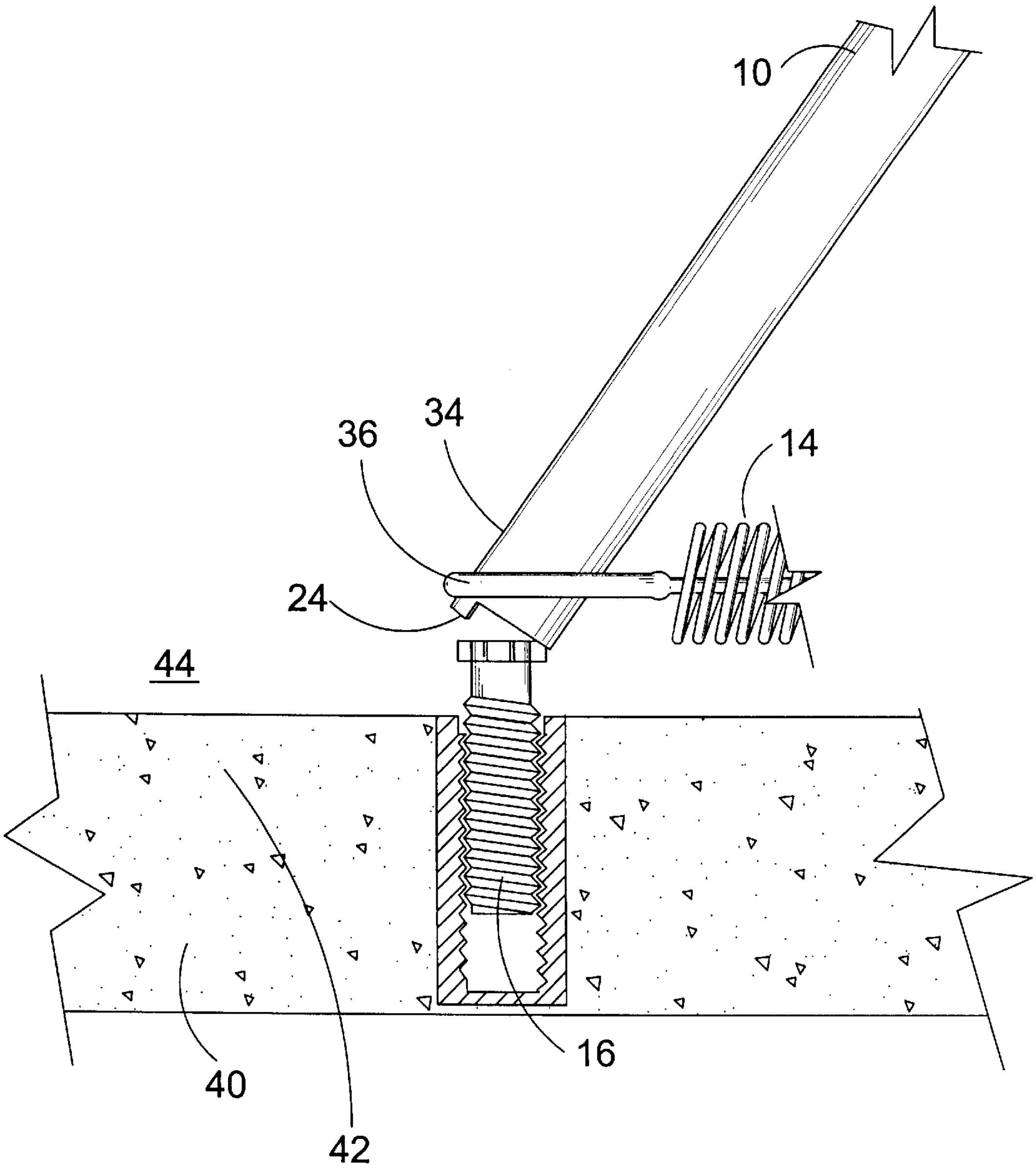
FIG. 11 is an enlarged sectional view of the spring tool removing the pool cover spring.

Turning to FIG. 11, shown therein is an enlarged sectional view of the spring tool 10 removing the pool cover spring 14. This sectional view relates to the removal of the pool cover springs 14 in which the safety cover installation tool 10 is placed over the anchor bolt 16 with the tab 24 inserted into the spring eyelet 36 cavity and then rotating the tool 10 by means of the handle until the tab 24 is positioned between the spring eyelet 36 and the anchor bolt 16 whereupon a force can be applied causing the spring eyelet 36 to slide up the lower end 34 of the handle until sufficient spring pressure has been released to remove the tool 10 from contact with the anchor bolt 16. Other elements previously disclosed are also shown.

I claim:

1. An apparatus for attaching or removing a compression spring eyelet of a swimming pool cover from an anchor bolt, said anchor bolt having an enlarged head, the eyelet having an opening therein, the opening for receiving the head of said anchor bolt, consisting of:

a) an elongated body having a first end and a second end, said elongated body being tubular;

b) one semi-circular tab extending from said first end of said elongated body, wherein said tab protrudes from said elongated body to permit insertion into the eyelet of the compression spring, said tab extending about one-half way around the circumference of said elongated body;

c) a handle disposed on said second end of said elongated body to permit a user to grasp the handle; and d) said tab adapted to surround said head of said anchor bolt when said first end of said elongated body is placed over said anchor bolt.

2. The apparatus of claim 1, further comprising a bend being disposed in said elongated body, said bend being disposed about one-fourth of the distance from said handle to said tab, wherein said handle is offset to one side from said elongated body.

3. The apparatus of claim 2, wherein said bend is disposed in a plane parallel to the longitudinal axis of the compression spring of the swimming pool cover when said tab is inserted into the eyelet of the compression spring.

4. The apparatus of claim 3, wherein said handle is t-shaped.

5. The apparatus of claim 4, wherein said t-shaped handle has a cavity therein, said cavity for receiving articles therein, said handle being open on each end.

6. The apparatus of claim 5, further comprising a cap disposed on each end of said handle to permit closure of said cavity of said handle.

7. The apparatus of claim 6, wherein said tab is disposed on a side of said elongated body opposite to a side of said elongated body toward which said handle is offset.

8. The apparatus of claim 6, wherein said tab operates in a plane parallel to the longitudinal axis of the compression spring of the swimming pool cover when said tab is inserted into the eyelet of the compression spring.

* * * * *